May 26, 1964 R. L. DREYFUS 3,134,210

METHOD OF FORMING BLISTER PACKAGES

Filed June 27, 1960

3,134,210
METHOD OF FORMING BLISTER PACKAGES
Robert L. Dreyfus, Arlington, Mass., assignor to W. R. Grace & Co., Cambridge, Mass., a corporation of Connecticut
Filed June 27, 1960, Ser. No. 38,999
4 Claims. (Cl. 53—30)

This invention relates to packaging with heat shrinkable materials and more particularly to the shaping of the heat shrinkable material by a novel process.

In the formation of blister packages in which the object packaged is mounted on a relatively rigid support and covered with a transparent plastic bubble which is secured to the support, it has been the practice heretofore to form the blister or bubble from thermostretchable materials which are softened by heat and formed by means of vacuum or pressure with or without the aid of a mold.

The present invention is concerned with blister packaging but employs a heat shrinkable material in place of the conventional heat stretchable material and forms the blister in a completely novel manner. The blister formed of heat shrinkable material may, if desired, be shrunk tightly over the object enclosed.

It is one of the objects of the present invention to provide a novel method of packaging and resulting package employing heat shrinkable film.

It is a further object to provide a novel blister package employing heat shrinkable film.

Another object is to provide a novel and simple method of forming blisters of varying shapes.

It is also an object to provide a blister which may be shrunk to fit tightly against the object being packaged.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The preferred embodiment of the process and product of the invention is illustrated in the drawing wherein.

Figure 1:
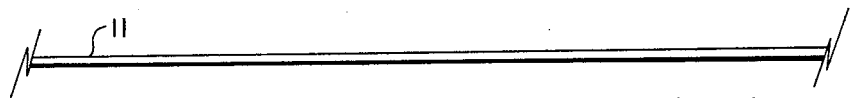
FIGURES 1–3 are elevational views showing various stages in the formation of the blister from heat shrinkable film.
Figure 2:
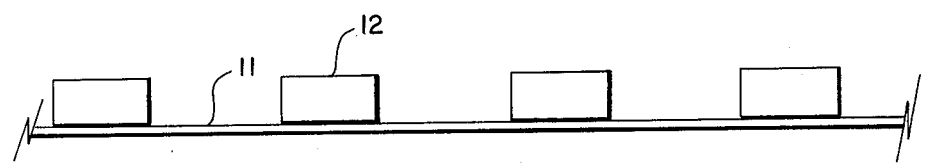
Figure 3:

The preferred shrinkable plastic material is heat shrinkable, irradiated, biaxially oriented polyethylene, specifically Alathon 14 which is a polyethylene having an average molecular weight of 20,000, density 0.916 and a melt index of 1.8 which has been irradiated to an extent of about 12 megarad and then biaxially stretched 350% in both a lateral and longitudinal direction. The irradiated biaxially oriented polyethylene film has a shrink energy of about 150 p.s.i. in both directions at 96° C.

There may also be employed in this invention polyethylene film which has been irradiated to an extent of 2 to 100 megarad, and preferably 6 to 20 megarad. The irradiation can be accomplished by the use of electron beam generators such as the General Electric 2 million volt resonant transformer unit, or by the use of high energy particle accelerators of 50,000 to 50,000,000 volts or by means of a Van de Graaf electron generator which operates at 2,000,000 volts. In addition to the use of electrons for irradiating polyethylene there can be employed other sources of radiation which are capable of producing beta or gamma rays. There can be employed any of the irradiation procedures disclosed in Baird et al. application Serial No. 713,848 filed February 7, 1958 (now U.S. Patent 3,022,543) or Rainer et al. Patent 2,877,500. The disclosures of the above-mentioned application and patent are hereby incorporated by reference.

The film may be oriented either monoaxially or biaxially. For purposes of this invention biaxially oriented film is preferred. It is possible to stretch polyethylene, irradiated in the manner previously described, from 100 to 700% longitudinally and from 100 to 900% laterally. Biaxial orientation results from the simultaneous radial and longitudinal stretching of the polyethylene. One method of biaxially orienting polyethylene is to force air into a heated tube of polyethylene forming a bubble which is trapped between two sets of pinch rolls. The tube of polyethylene undergoes a radial and longitudinal stretch to accommodate the air bubble. This process is described in detail in the Baird et al. application referred to above.

The biaxially oriented polyethylene prepared as above has a high shrink energy, e.g. 100 to 500 p.s.i. at 96° C. Shrink energy is the force of contraction at a given temperature when the material is restrained and more specifically it is the measurable tension produced in a fully monodirectionally restrained strip of film when heated to the specified temperature.

As starting polyethylene there may be employed high, medium or low density polyethylene produced by high or low pressure techniques and having an average molecular weight ranging from 7,000 to 35,000 or even higher.

In place of irradiated polyethylene there can be employed irradiated solid polypropylene, solid copolymers of ethylene and propylene (e.g. 50–50 copolymers) and solid copolymers of ethylene with a minor amount, e.g. 5%, of isobutylene, amylene, acetylene, butadiene, butene 1 or butene 2, block copolymers of polyethylene with a minor amount, e.g. 5%, of polyisobutylene and graft copolymers of polyethylene or polypropylene with monomers such as acetylene, butadiene, butylene, ethylene or propylene which materials are subsequently oriented. Also useful in the present invention is oriented non-irradiated polypropylene and oriented polyvinyl chloride.

Referring now more particularly to FIGURE 1 of the drawings: numeral 11 refers to a sheet of irradiated, biaxially oriented polyethylene film which is approximately 6 inches wide and 14 inches long and 1 mil thick. The sheet of film is laid flat upon any suitable support, not shown in the drawings, and a number of round wooden forms 12 approximately ½ inch in diameter and 3 inches high were then placed on end upon the polyethylene sheet and were spaced about 3½ inches apart along the center line of the film. Heat from a hot air source, capable of generating a gas temperature of from 400° to 600° F. is directed against the film at one end and moved uniformly along the film to the other end. The film is heated sufficiently to cause it to shrink in all areas except directly under the forms. The film will shrink to approximately 25% of its original size and as it shrinks it will thicken to approximately 15 mils.

As the film in the area of the forms shrinks it will rise against the sides of the rods to a height as high as ½ inch. The forms are removed from the shrunken strip of film which is now approximately 4 inches long and 1½ inches wide and has regularly spaced pockets or blisters 13.

Figure 4:
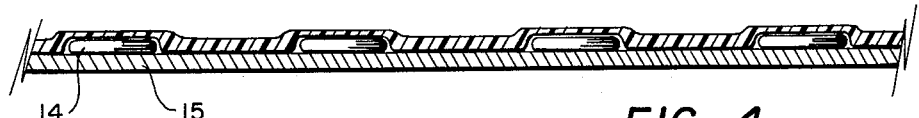
FIGURE 4 is an elevational view, partially in section, showing the novel blister package of this invention.
Figure 5:
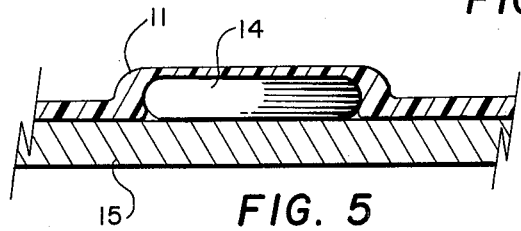
FIGURE 5 is a detailed elevational view, partially in section, of the blister package of this invention.

Suitable objects 14 may be placed within the pockets or blisters and the polyethylene then affixed to a suitable support 15 as shown in FIGURE 4 and in more detail in FIGURE 5. The thickened polyethylene strip containing the blisters may be attached to the support in any conventional manner, e.g. glueing, stapling or heat sealing to a thermoplastic coated card. Alternatively the object may be affixed to the support and then covered with the plastic blister.

The blister may be shrunk against the enclosed object by the application of heat thereby producing a neat, tight and transparent package.

The size and shape of the pockets or blisters may be varied by varying the size and shape of the forms which are used to cover the film prior to shrinking. For example, it is possible to obtain square blisters by using square forms. The forms may be composed of any material that is not sensitive to heat at the temperatures employed in shrinking the film, e.g. wooden forms.

It is obvious that single blisters or multiple blisters may be formed on a single relatively small section of film or that the blisters may be formed continuously on a continuous strip of film.

While a hot air gun is an excellent source of heat for shrinking the film, other heat sources could be employed and any temperature that is high enough to shrink the film without melting or softening the film will be satisfactory.

The support upon which the preformed blister is mounted is any one of those materials previously used in blister packaging and includes, for example, paperboard sheets, rigid plastic sheets, etc.

It is possible to prepare even deeper blisters by a modification of the above-described process. By using a larger form than is necessary to obtain the blister desired, shrinking the film, removing the form and then placing a smaller form within the thus-formed blister and again shrinking the film about the smaller form, a deeper blister will result than would otherwise be possible.

Deeper and larger blisters may also be obtained with the aid of pockets into which the blanks or forms are placed prior to shrinking. A sheet of heat shrinkable film is placed upon a flat support which contains a recessed pocket. The blank or form is placed on the top of the film and pushed into the pocket. The film is shrunk as in the above examples and produces a deep blister which is useful to package articles in the manner heretofore described.

I claim:

1. A method of packaging which comprises placing a flat sheet of heat shrinkable film on a support having a recess in the surface thereof, placing a relatively thick heat resistant form having vertically extended substantially straight sides on the exterior surface of said film in alignment with said recess, forcing said form and film into said recess, applying heat to the film while said form remains in said recess causing the film to shrink, except for the area in contact with the form which is restrained by the form and shielded from the heat, thereby causing the film to rise up against, but not above, the sides of the form thus conforming to the configuration thereof and forming a pocket in the film about the form, discontinuing the application of heat, removing said form from said pocket, placing an object which is substantially smaller than said pocket on a support, positioning said pocket over said object and securing said film to said support.

2. The method of claim 1 including the additional step of shrinking said pocket.

3. The method of claim 1 wherein said heat shrinkable film is an oriented plastic film.

4. The method of claim 1 wherein said heat shrinkable film is irradiated, biaxially oriented polyethylene.

References Cited in the file of this patent

UNITED STATES PATENTS

| | | |
|---|---|---|
| 2,668,403 | Rumsey | Feb. 9, 1954 |
| 2,690,593 | Abercrombie | Oct. 5, 1954 |
| 2,757,793 | Deitz | Aug. 7, 1956 |
| 2,861,404 | Stratton | Nov. 25, 1958 |
| 2,876,899 | Maynard | Mar. 10, 1959 |
| 2,878,628 | Curry | Mar. 24, 1959 |
| 2,885,105 | Heyl et al. | May 5, 1959 |
| 2,890,552 | Henderson | June 16, 1959 |
| 2,927,409 | Heyer | Mar. 8, 1960 |
| 2,941,664 | Palmer | June 21, 1960 |
| 2,976,655 | Dreyfus et al. | Mar. 28, 1961 |
| 3,022,614 | Dreyfus et al. | Feb. 27, 1962 |
| 3,095,677 | Dreyfus et al. | July 2, 1963 |

FOREIGN PATENTS

| | | |
|---|---|---|
| 761,075 | Great Britain | Nov. 7, 1956 |